Nov. 12, 1946.  T. W. MILLNS  2,411,101
POWER TRANSMISSION MECHANISM
Filed Jan. 16, 1945

Inventor
T. W. Millns
By Glascock Downing Seebold
attys

Patented Nov. 12, 1946

2,411,101

UNITED STATES PATENT OFFICE 2,411,101

POWER TRANSMISSION MECHANISM

Terence William Millns, Willesden Junction, London, England, assignor to Rotax Limited, London, England Application January 16, 1945, Serial No. 573,065
In Great Britain December 6, 1943

2 Claims. (Cl. 192—.02)

This invention relates to power transmission mechanisms of the kind comprising an electric motor, an epicyclic reduction gear and an intermediate friction clutch. In particular the invention relates to mechanisms of the said kind adapted to actuate through a nut and screw the shutter of an aircraft engine, but it is also applicable to such mechanisms as adapted for other analogous uses.

The motor is necessarily a high speed machine and its momentum when in action is considerable. Consequently when the operation to be performed by the mechanism has been completed, and the motor circuit is opened, the motor armature by reason of its momentum continues to drive the mechanism to which it is connected and so impart undesired excess movement to the said mechanism. What is required is that the motion of the said mechanism shall be arrested as quickly as possible after the motor circuit has been opened and to minimise continued action by the momentum of the motor armature. The object of the present invention is to enable this requirement to be met in a simple and satisfactory manner.

In the accompanying sheet of explanatory drawings.

Figure 3:
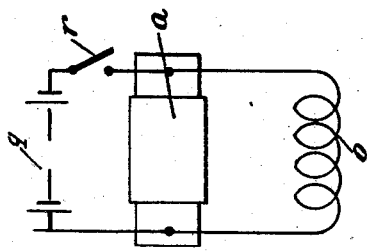
Figure 3 is an electrical diagram.

In the drawing $a$ indicates an electric motor, $b$ a multi-stage epicyclic reduction gear, and $c$ a friction clutch interconnecting the motor and gear, the clutch having a pair of complementary friction members $d$, $e$ which serve by engagement with each other to interconnect the armature spindle $f$ of the motor and the driving spindle $g$ of the epicyclic gear. The friction member $d$ is formed on or secured to the spindle $g$, and the friction member $e$ is slidable on but rotatable by the spindle $f$, the latter friction member being held in engagement with the other by a spring $h$. The motor $a$, gear $b$, and clutch $c$ are contained in a stationary housing $i$.

Figure 2:
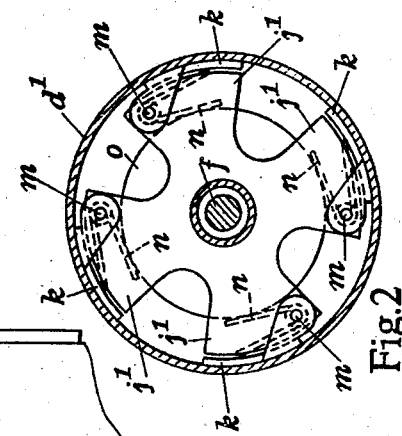
Figure 2 is a section on the line 2—2 of Figure 1.
Figure 1:
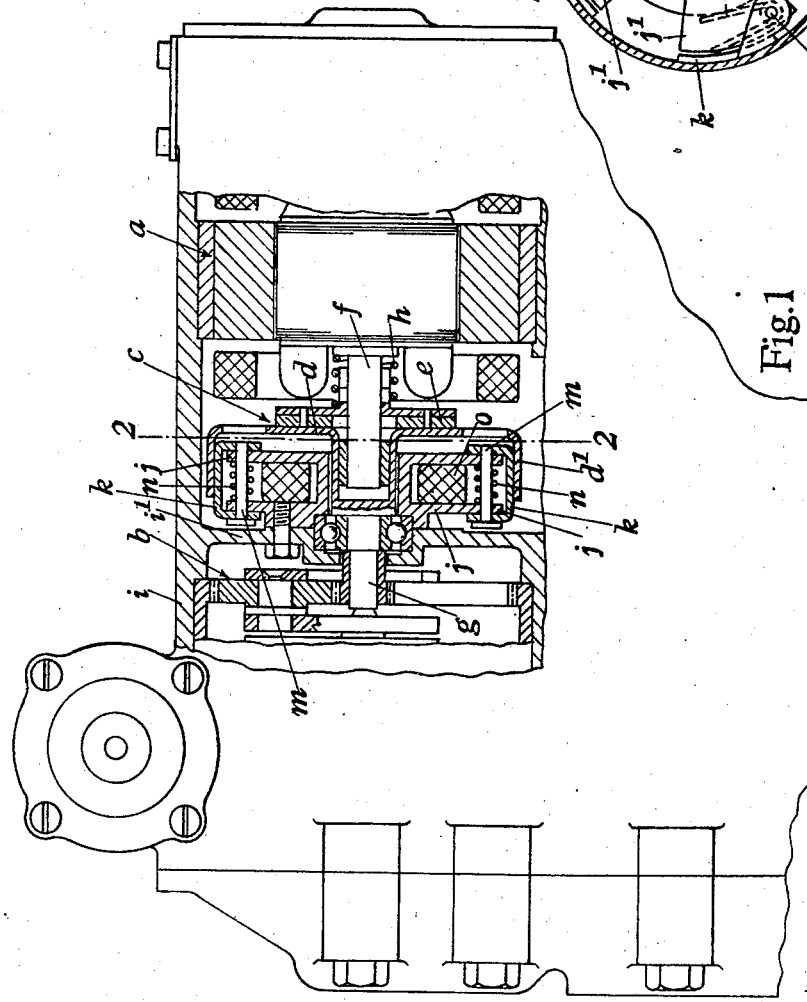
Figure 1 is a part sectional side elevation of a power transmission mechanism embodying the invention.

In carrying the invention into effect as shown, I employ as the friction member $d$ one end of a brake drum $d^1$ which I form on or secure to the driving spindle $g$ of the epicyclic gear $b$, and on an adjacent part $i^1$ of the stationary housing $i$ I secure a magnetisable member $j$. Also I pivotally mount on the magnetisable member $j$ a plurality of brake shoes $k$ adapted to act on the inner periphery of the drum $d^1$. The magnetisable member $j$ consists of an annular channel which is arranged coaxially within the brake drum $d^1$, and the sides of which are each shaped to provide a plurality (e. g. four) of spaced parts $j^1$ which project radially outwards and serve as pole pieces, the projecting parts of the one side being situated opposite to those of the other side. Each shoe $k$ is arranged to bridge an oppositely situated pair of the parts $j^1$, and is carried by a pin $m$ passing transversely through this pair of parts and through lugs $k^1$ on the shoe. Further, each shoe $k$ is shaped so that it overhangs one side of its pivot axis, and the arrangement is such that adjacent shoes extend from opposite sides of their pivot axes as shown in Figure 2. Consequently, when the shoes $k$ are in contact with the inner periphery of the drum $d^1$, the tendency of the latter to rotate in either direction causes the pressure of alternate shoes, and thus the retarding action of these shoes, on the drum to be increased. Also each shoe has combined with it a spring $n$ by which it is moved into contact with the drum. Moreover I combine with the magnetisable member $j$ an annular winding $o$ adapted to be connected to the motor circuit in the manner illustrated in Figure 3, the arrangement being such that when the said member is magnetised by current in the winding $o$, the shoes $k$ are retracted from the drum against the action of their springs $n$. The circuit of the motor $a$ is adapted to be supplied with current from any convenient source $q$ under the control of a switch $r$.

The mechanism above described is such that so long as the motor $a$ is in action, the brake shoes $k$ are held out of action, but on opening the motor circuit, the shoes are released and pressed by their springs $n$ into contact with the drum $d^1$, causing the latter and the associated epicyclic gear $b$ to be brought to rest quickly and independently of the motor. Meanwhile the friction clutch $c$ slips and has a braking action on the armature of the motor $a$.

The invention is not, however, limited to the example above described, as the form of the various parts may be modified to suit different requirements.

Having thus described my invention what I claim as new and desire to secure by Letters Patent is:

1. A power transmission mechanism comprising an electric motor, an epicyclic reduction gear having a driving spindle, a friction clutch situated between the motor and reduction gear, and an electromagnetically controlled brake which is adapted to arrest the motion of the gear automatically when the motor circuit is opened, and which comprises in combination a drum provided on the driving spindle of the reduction gear and forming a part of the friction clutch, a stationary magnetisable member, spring-loaded shoes carried by the magnetisable member and adapted to act on the drum, and an annular winding adapted to magnetise the said member and to be connected to the motor circuit.

2. A power transmission mechanism as claimed in claim 1, in which the shoes are pivotally mounted, and are shaped and arranged so that the tendency of the drum to rotate in either direction with the shoes in contact therewith increases the pressure, and consequently the retarding action, of some of the shoes on the drum.

TERENCE WILLIAM MILLNS.